United States Patent [19]

Meehan

[11] Patent Number: 5,555,530
[45] Date of Patent: Sep. 10, 1996

[54] METHOD FOR IMPROVING SIGNAL TO NOISE RATIO

[75] Inventor: Richard J. Meehan, Cambridge, England

[73] Assignee: Schlumberger Technology Corporation, Sugar Land, Tex.

[21] Appl. No.: 163,444

[22] Filed: Dec. 6, 1993

[30] Foreign Application Priority Data

Dec. 12, 1992 [GB] United Kingdom .................. 9225985

[51] Int. Cl.$^6$ .............................. G01V 1/36; G01V 1/40; G01J 1/00
[52] U.S. Cl. ................................ 367/45; 367/21; 367/52; 367/56; 364/421; 364/422
[58] Field of Search .......................... 367/21, 45, 52, 367/56; 364/421, 422

[56] References Cited

U.S. PATENT DOCUMENTS

| | | |
|---|---|---|
| 4,206,509 | 6/1980 | Ruehle . |
| 4,208,732 | 6/1980 | Ruehle . |
| 4,363,112 | 12/1982 | Widrow . |
| 4,556,962 | 12/1985 | Widrow . |
| 4,791,390 | 12/1988 | Harris et al. . |
| 4,849,945 | 7/1989 | Widrow . |
| 4,862,115 | 8/1989 | Lee et al. . |
| 4,890,264 | 12/1989 | Crews et al. ............................ 367/45 |
| 4,964,087 | 10/1990 | Widrow . |
| 5,109,947 | 5/1992 | Rector, III . |
| 5,251,183 | 10/1993 | McConnell et al. ...................... 367/45 |

FOREIGN PATENT DOCUMENTS

| | | |
|---|---|---|
| 602703 | 6/1994 | European Pat. Off. . |
| 2273358 | 6/1994 | United Kingdom . |
| 2273359 | 6/1994 | United Kingdom . |
| 2282664 | 4/1995 | United Kingdom . |
| WO88/04435 | 6/1988 | WIPO . |

*Primary Examiner*—Nelson Moskowitz
*Attorney, Agent, or Firm*—Wayne I. Kanak

[57] ABSTRACT

A method for improving the signal to noise ratio from a pair of detectors such as geophones which each detect a noisy signal comprising a signal of interest (S) and a noise signal (N), wherein the signal of interest (S) has a different moveout across the pair of detectors from that of the noise signal (N), and the noise signal (N) from a given source is detected at the first detector at a time $\Delta t$ before the corresponding noise signal is detected at the second detector, the method comprising delaying the noisy signal (S+N) detected at the first detector by an amount $\tau$ being greater than the moveout of the signal of interest but not more than $\Delta t$ and subtracting the delayed signal from that detected at the second detector by means of an adaptive filter so as to minimize the power in the resultant signal. The signal detected at the first detection and optionally the resultant signal can also be delayed by an amount $\tau_2$ and the signal detected at the second detector is subtracted from the delayed first detector (and resultant signals) by means of an adaptive filter so as to minimize the power in the final signal, the delay $\tau_2$ being greater than the moveout of the signal of interest plus the length of the filter but not more than $\Delta t$ plus the length of the filter.

26 Claims, 11 Drawing Sheets

LAG(Seconds)

Fig.4.

LAG(Seconds)

Fig.5.

LAG(Seconds)

LAG(Seconds)

Fig.10.

LAG(Seconds)

Fig.11.

LAG(Seconds)

LAG (Seconds)

LAG(Seconds)

Fig.20.

LAG(Seconds)

Fig.19.

LAG (Seconds)

Fig.21.

LAG (Seconds)

5,555,530

METHOD FOR IMPROVING SIGNAL TO NOISE RATIO

BACKGROUND OF THE INVENTION

1. Field of the Invention

The present invention relates to a method of improving the signal to noise ratio (S/N ratio) of a noisy signal. In particular, the invention relates to a method for improving the S/N ratio of a seismic signal obtained while drilling a well using the drill bit as the seismic source.

2. Description of the Related Art

The present invention finds particular applicability in the seismic-while-drilling (SWD) situation in which a roller-cone drill bit acts as the source of seismic signals while drilling the formation and the signals propagate to the surface via the formation and/or drill string where they are detected with geophones. For an SWD survey, the signal of interest is the signal which travels directly from the bit (or other point of contact between the drill swing and the borehole) to the geophones. Unfortunately, the geophones will also detect noise emanating from the rig due to machinery associated with the drilling process such as mud pumps and diesel engines which couple to the drill swing via the mud hose and other connections and travels along the surface directly to the geophones. This latter noise is known as ground roll and causes particular problems in SWD measurements.

The currently proposed technique for reducing the effect of ground roll in SWD surveys is to provide an array of several geophones, typically arranged in a line pointing towards the major source of ground roll, usually the drilling rig itself. The signals recorded at each geophone are summed together in analogue form to produce a single array output. The array is typically arranged such that its length is at least one wavelength of the lowest frequency component of the ground roll and the spacing between geophones is sufficiently small as to prevent aliasing of the highest frequency component. The total length of the array must be sufficiently small that the seismic signal arrives at substantially the same time at each geophone. When the geophone signals are summed the ground roll is attenuated but the seismic signal is preserved.

An alternative method of reducing interfering signals is proposed in U.S. Pat. No. 4,556,962. In this method, which relates to conventional seismic surveying, it is attempted to reduce the ground roll signal from a surface seismic source by placing a sensor close to the source to detect the interfering signal which is then amplified or attenuated, delayed and summed with the signals from the geophone array which are cross correlated with the original source signal. It is suggested that an adaptive filter be used so as to modify the delayed signal to correspond more closely to that detected by the array. The technique attempts to exploit the relative difference in the ratio of signal amplitude to ground roll amplitude between the geophone array and the sensor positioned close to the source. However, since the ground roll is dispersive in nature, the signal measured close to the source may be substantially different from that received by the geophone array and the adaptive filter might not be able to deal with this.

SUMMARY OF THE INVENTION

It is an object of the present invention to provide a signal processing method which can be used to improve the S/N ratio of SWD signals by reducing the effect of ground roll. The present invention achieves this object by utilizing the difference in moveout between the signal of interest and noise across detectors by delaying a first signal so as to effectively provide an advanced version of the noise signal relative to a second signal but a delayed version of the signal of interest.

In accordance with the present invention, there is provided a method for improving the signal to noise ratio from a pair of detectors which each detect a noisy signal comprising a signal of interest (S) and a noise signal (N) the separation of the detectors being such that the noise signal (N) detected at a second detector is substantially the same as that detected at a first detector, wherein the signal of interest (S) has a different moveout across the pair of detectors from that of the noise signal (N), and the noise signal (N) from a given source is detected at the first detector at a time $\Delta t$ before the corresponding noise signal is detected at the second detector, the method comprising delaying the noisy signal (S+N) detected at the first detector by an amount $\tau$ being greater than the moveout of the signal of interest but not more than $\Delta t$ and either subtracting the delayed signal or the signal detected at the second detector from the other by means of an adaptive filter so as to minimize the power in the resultant signal.

One embodiment of the method comprises delaying the noisy signal (S+N) detected at the first detector by an amount $\tau$ being greater than the moveout of the signal of interest but not more than $\Delta t$ and subtracting the delayed signal from that detected at the second detector by means of the adaptive filter so as to minimize the power in the resultant signal.

Another embodiment of the method comprises delaying the noisy signal (S+N) detected at the first detector by an amount $\tau_2$ being greater than the moveout of the signal of interest plus the length of the filter $\Delta t_{filter}$ but not more than $\Delta t$ plus the length of the filter $\Delta t_{filter}$ and subtracting the signal detected at the second detector from the delayed signal by means of the adaptive filter so as to minimize the power in the resultant signal.

The present invention, also provides a detector system for improved signal to noise ratio performance comprising:

a) a pair of detectors arranged such that a signal of interest (S) has a different moveout across the pair of detectors from a noise signal (N) which arrives at a first detector of the pair at a time $\Delta t$ before the corresponding noise signal arrives at the second detector of the pair; the separation of the detectors being such that the noise signal N detected at the second detector is substantially the same as that detected at the first detector;

b) means for delaying the noisy signal (S+N) detected by the first detector by an amount $\tau$ being greater than the moveout of the signal of interest but not more than $\Delta t$;

c) means for subtracting either of the delayed signal or the signal (S+N) detected by the second detector from the other, said means comprising an adaptive filter arranged to minimize the power in the resultant signal after subtraction.

One embodiment of the detection system subtracts the delayed signal from the signal (S+N) detected by the second detector so as to minimize the power in the resultant signal after subtraction.

Another embodiment of the detection system delays the noisy signal (S+N) detected by the first detector by an amount $\tau_2$ being greater than the moveout of the signal of interest but not more than $\Delta t$ and the adaptive filter subtracts the signal (S+N) detected by the second detector from the delayed signal, said adaptive filter having length $\Delta t_{filter}$ wherein $\Delta t_{filter}$ is added to the moveout of the signal of interest and to $\Delta t$ when determining $\tau_2$.

A preferred embodiment of the invention, comprises a combination of the method and system according to the invention respectively.

While the technique of the present invention can be performed with two detectors, it is also possible to use more than two, the pair of detectors forming pan of a larger array which can optionally include a beam steering arrangement.

It will be appreciated that the technique according to the present invention can be applied to any situation where a signal of interest has a different moveout across the pair of detectors from that of the noise signal. Such techniques might include seismic applications other than SWD or other non-seismic application as long as this difference in moveout between noise and signal of interest is present.

BRIEF DESCRIPTION OF THE DRAWINGS

The present invention will now be described by way of example, with reference to the accompanying drawings, in which.

DESCRIPTION OF THE PREFERRED EMBODIMENT

Figure 1:
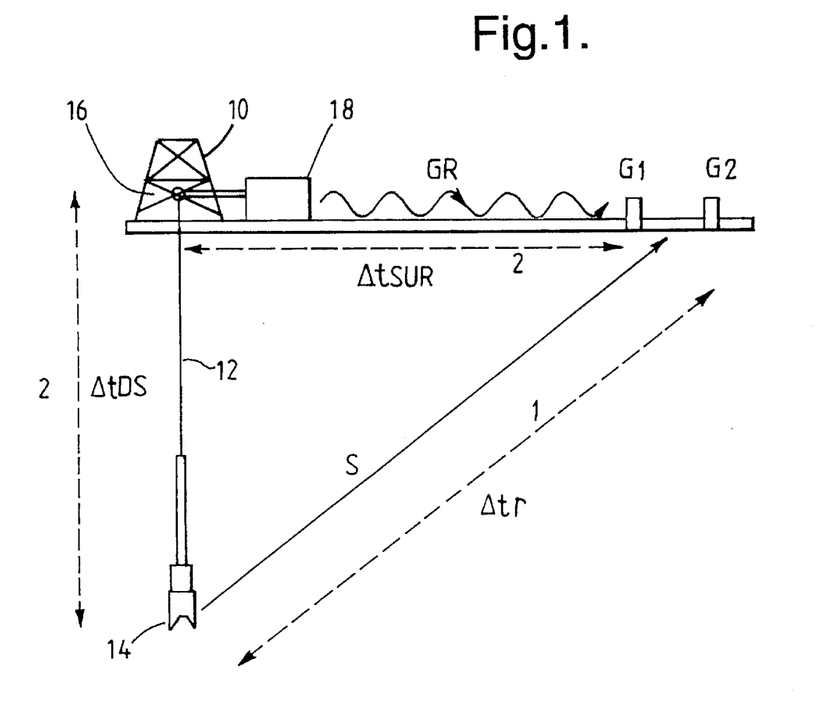
FIG. 1 shows a diagramatic view of the SWD situation.

Referring now to the drawings, FIG. 1 shows a conventional land SWD arrangement comprising a drilling FIG. 10 including a drill string 12 having a rollercone bit 14 at the lower end thereof. A sensor 16 is located on the rig 10 at the top of the drill string 12 to detect vibrations and the various ancillary equipment such as diesel engine, mud pumps etc are shown generally at 18. Geophones $G_1$, $G_2$ are placed on the ground surface in a linear arrangement with the rig 10 and spaced some distance therefrom. During drilling, the seismic signal is generated by the bit 14 and propagates through the formation to the geophones $G_1$, $G_2$. The signal also travels through the drill string to the sensor 16. The noise generated by the equipment 18 will also be detected by the sensor 16 and will travel along the surface of the ground to the geophones $G_1$, $G_2$. This latter noise is known as ground roll GR. A typical geometry for this arrangement has a drill bit depth of 650 m, geophone $G_1$ is 170 m from the rig and geophone $G_2$ is 2.44 m from $G_1$.

Figure 2:
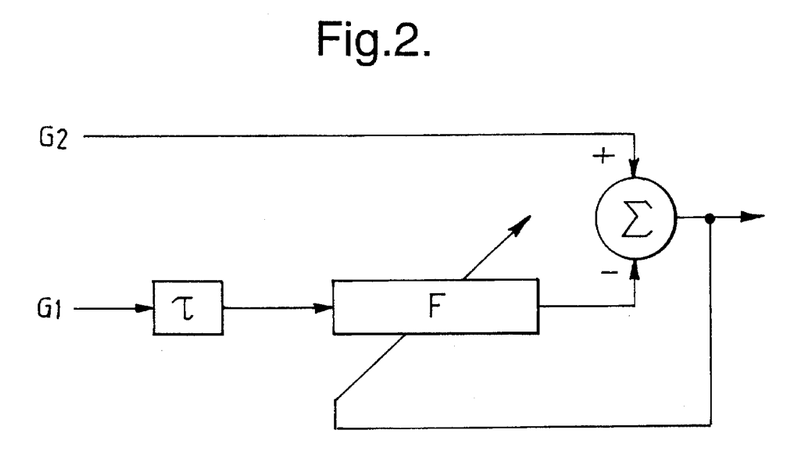
FIG. 2 shows a processing block diagram of the technique according to one embodiment of the invention.

The technique according to the present invention needs only two geophones but is easily adapted to work with more than two. The geophones are arranged as shown in FIG. 1. The separation between the geophones is such that when the signal from geophone $G_1$ is delayed such that the seismic signal S arrives at both geophones at the same time (i.e. cancelling the moveout of the seismic signal), the ground roll GR arrives at geophone $G_1$ $\Delta t_{GR}$ seconds before geophone $G_2$. However, the separation between the geophones must be sufficiently small that the GR signal detected by each is substantially the same. Instead of exploiting the difference in amplitude ratios (of GR to S) between the two geophones, the technique according to the present invention exploits the difference in moveout of the two signals across the two geophone array. The appropriate processing sequence is shown in FIG. 2. The signal from $G_1$ contains a delayed ($\tau$) version of the GR with respect to $G_1$ but now has an advanced version of S. If $G_1$ is now subtracted from $G_2$ by means of an adaptive filter F the amplitude of GR in $G_2$ can be reduced. If the seismic signal S is non-periodic then since F is causal and $G_1$ contains a delayed version of S with respect to $G_2$ then S cannot be removed from $G_2$. The adaptive filter can be adjusted by any adaptive algorithm, e.g. LMS, RLS, LSL, FTF, etc, see: "Adaptive Filter Theory" S Haykin, 1986 Prentice Hall, N.J. If S contains multiples (e.g. from internal reflections within the drill string or from reflectors within the earth) then it might be expected that these multiples would be removed from $G_2$ since the delayed version of $G_1$ would contain sufficient information to do this. However since the adaptive filter tries to minimize the output energy of the system this signal cancellation will only occur if the energy contained in the multiples in S is significant compared to the energy in GR.

If the ground roll GR is correlated with S then signal cancellation could occur. FIG. 1 shows a situation when such correlation is present. The seismic signal S is generated at the bit. It can reach the geophones by two paths. In path 1 it travels through the formation, taking $\Delta t_f$ seconds to reach the geophones. In path 2 it travels through the drill string taking $\Delta t_{DS}$ seconds to reach the rig. When at the rig it couples into the ground and travels along the surface, reaching the geophones $\Delta t_{sur}$ second later. If $\Delta t_{DS} + \Delta t_{sur} < \Delta t_f$, i.e. if path 2 is faster than path 1, then signal cancellation will occur. Thus if there is significant coupling of S into the ground at the rig the geophones must be positioned in such a way to ensure that path 2 is slower than path 1. Another factor which could cause problems in this respect is the length of the filter since this could effectively include the seismic signal in with the ground roll signal which is to be removed. Therefore the length of the filter must be selected to avoid this.

Figure 3:
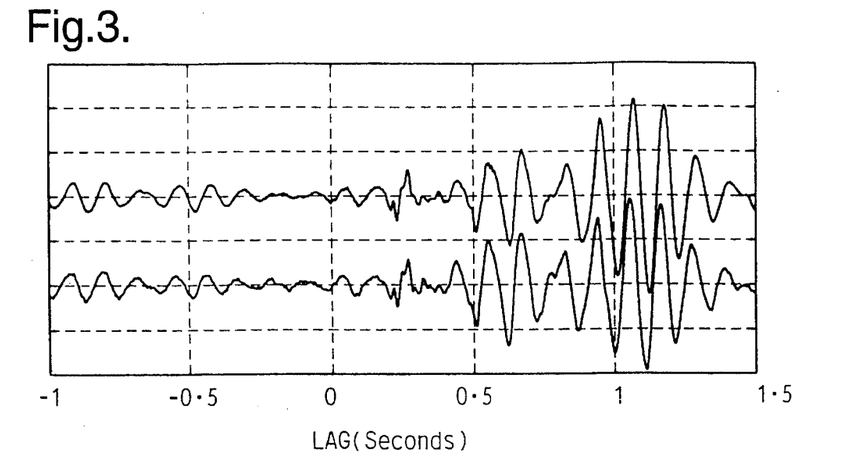
FIG. 3 shows a plot of cross correlation of geophones and rig sensor.
Figure 4:
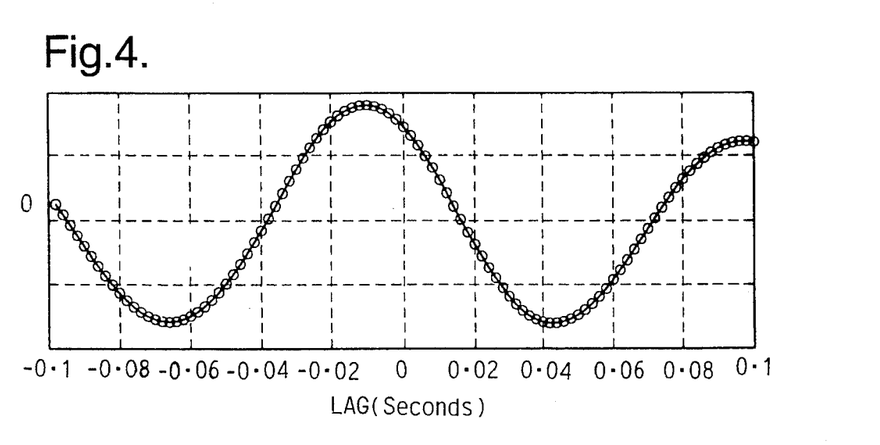
FIG. 4 shows a plot of cross correlation between two geophone signals.
Figure 5:
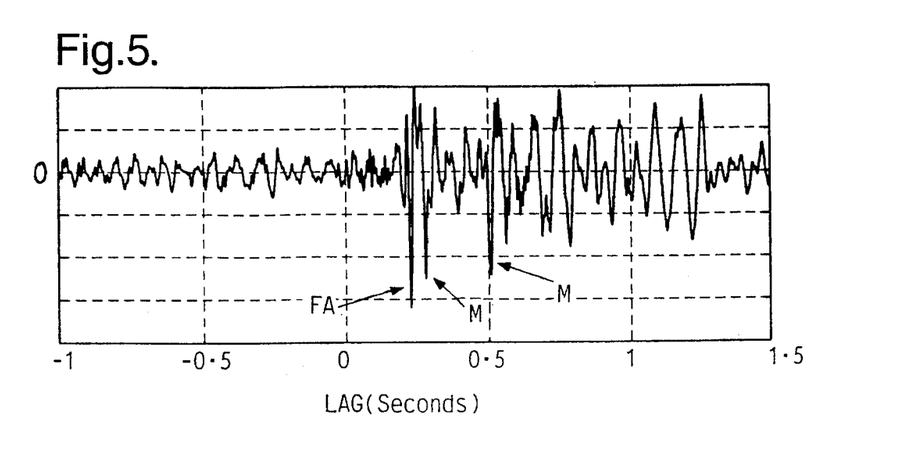
FIG. 5 shows a plot of the cross correlation between the processed geophone signals and the rig sensor signal.

In the acquisition geometry of a drilling test shown in FIG. 1, the signals, two geophones and one rig sensor, were logged at 500 Hz. FIG. 3 shows the cross correlation between the geophone signals and the rig sensor. The multiples in the rig sensor signal due to the drill string structure were removed prior to the cross correlation. The moveout of the ground roll signal can be seen. The value of $\Delta t_{GR}$ for this case can be found by cross correlating the two geophone signals. The result of doing this is shown in FIG. 4. The value is 4 sample intervals, i.e. the ground roll arrives at the first geophone 7.81 milliseconds before it arrives at the second geophone. Delaying the signal from $G_1$ by 2 sample intervals and adaptively subtracting it from $G_2$ (using a normalized LMS algorithm with 20 tap weights) yields a signal in which the ground roll should be attenuated. If we cross correlate this signal with the rig sensor signal we obtain the result shown in FIG. 5. The fast arrival FA is now evident, as is a multiple M due to reflection of the signal S from the top of the drill string (i.e. S travels up the drill string, is reflected from the travelling block, travels back down the drill string and is re-radiated from the bit). The ground roll has been effectively attenuated.

Figure 6:
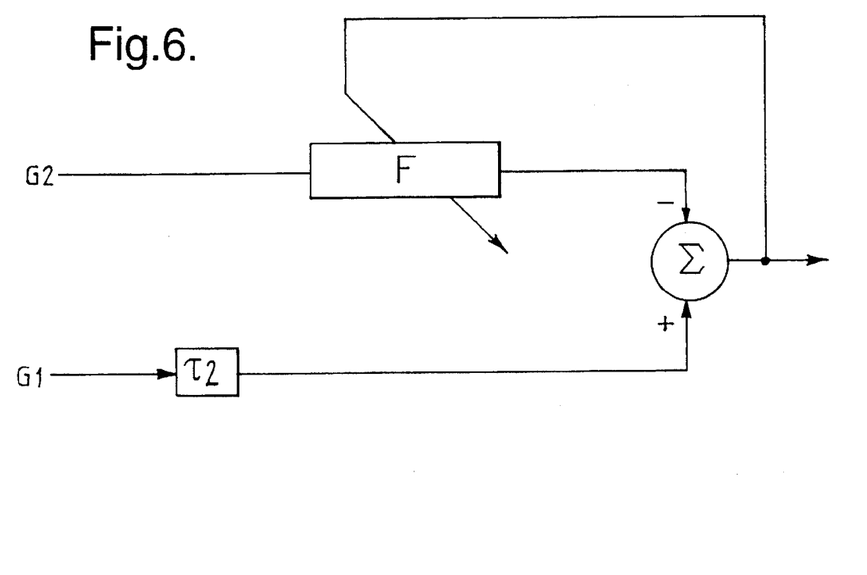
FIG. 6 shows a signal flow diagram of a system embodying the second aspect of the invention.

It will be appreciated that the processing technique according to the first aspect of the present invention described above in relation to FIG. 2 removes the ground roll signal $GR_1$ detected at geophone $G_1$ from the combined $S+GR_2$ signal detected at $G_2$. Since $GR_1$ and $GR_2$ are substantially the same, the signal to noise ratio of $G_2$ would be improved. Likewise, in the method according to the second aspect of the invention, the ground roll $GR_2$ from $G_2$ is removed from the combined $S+GR_2$ signal detected at $G_1$. The processing from this is shown in FIG. 6. In this case the signal from $G_1$ is delayed by an amount $\tau_2$ and the signal from $G_2$ is subtracted from the delayed $G_1$ signal by means of an adaptive filter F of length $\Delta\tau_{filter}$. The delay $\tau_2$ should satisfy the requirement $$\Delta\tau_{filter} < \tau_2 < \Delta t_{GR} + \Delta\tau_{filter}$$

The problem of signal cancellation outlined above with regard to the system of FIG. 2 also applies to that of FIG. 6 and similar considerations of path length, geophone spacing and filter length apply.

The two techniques described above can be combined in the manner shown in FIG. 7. In this case, the output from $G_1$ is split into two. A first part is delayed by an amount $\tau$ and subtracted from the $G_2$ signal by means of an adaptive filter to produce an intermediate signal I. A second part is delayed by an amount $\tau_2$ and the $G_2$ signal is subtracted from this and from the intermediate signal I which is likewise delayed by an amount $\tau_2$ since the intermediate signal is effectively undelayed (i.e. $G_2-G_1(\tau)$). The advantage of combining both techniques is that any distortion due to the inclusion of the signal of interest in the ground roll signal which is subtracted will be symmetrical and spread out.

The technique according to the invention can be extended to the case where there are more than two geophones. In the arrangement shown in FIG. 8 geophone $G_1$ is closest to the rig and geophone $G_n$ furthest away. In this case adaptive filters are used to subtract relatively delayed versions of geophones $G_1$ to $G_{k-1}$ and relatively advanced versions of geophones $G_{k-1}$ to $G_n$ from geophone $G_k$. The sizes of the delays/advances $\tau$ are chosen to ensure that the seismic signal S cannot be cancelled. It is obvious that this structure can be used to remove the ground roll from any one of the geophone signals by using appropriately delayed or advanced versions of all or some of the other geophone signals. Thus for n geophones we can have n outputs. These output can then be simply added together, or may be beamformed to further reduce interfering noise. While the term "advanced" has been used in relation to some of the signals, it will be appreciated that the same effect can be obtained by delaying the signal $G_k$. Since the ground roll is dispersive, it may not be advantageous to apply this technique to all of a large array but benefit can be obtained for small portions of such an array.

Figure 7:
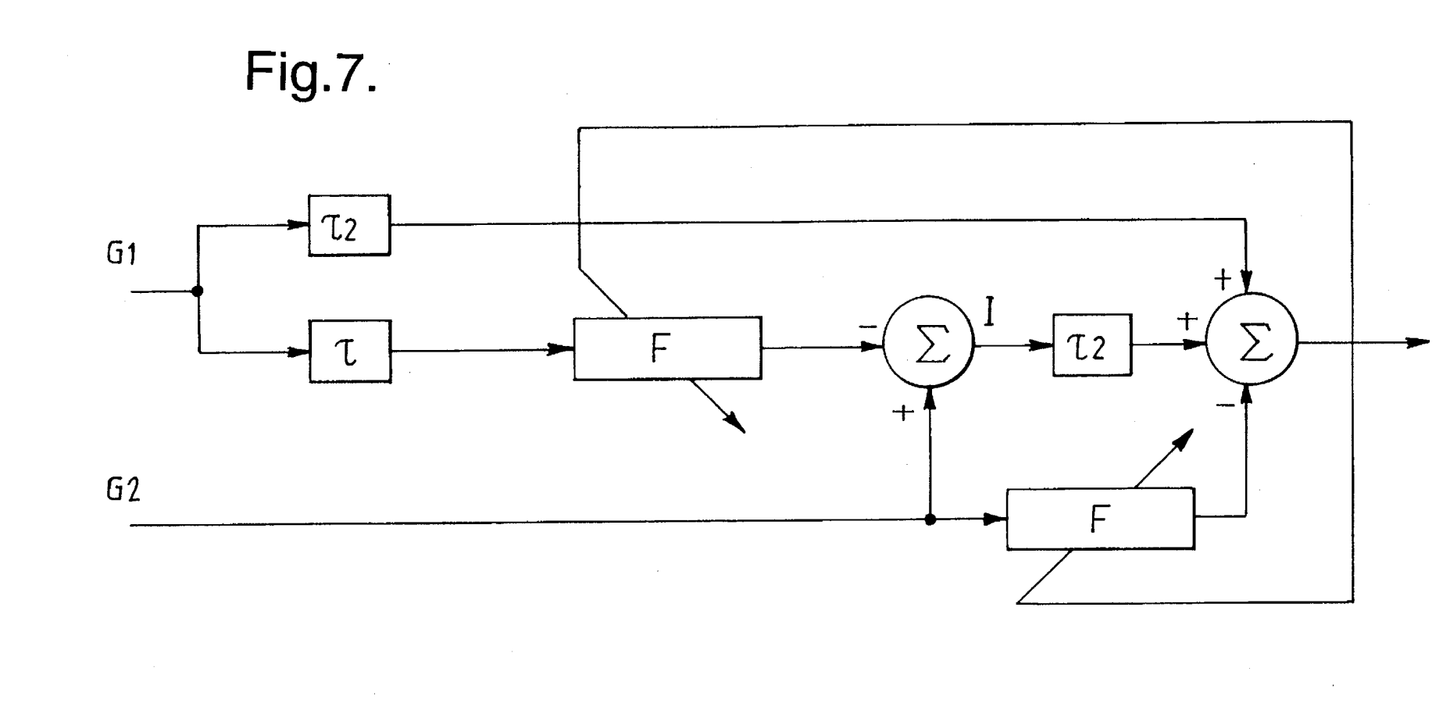
FIG. 7 shows a signal flow diagram of a system embodying both first and second aspects of the invention.
Figure 8:
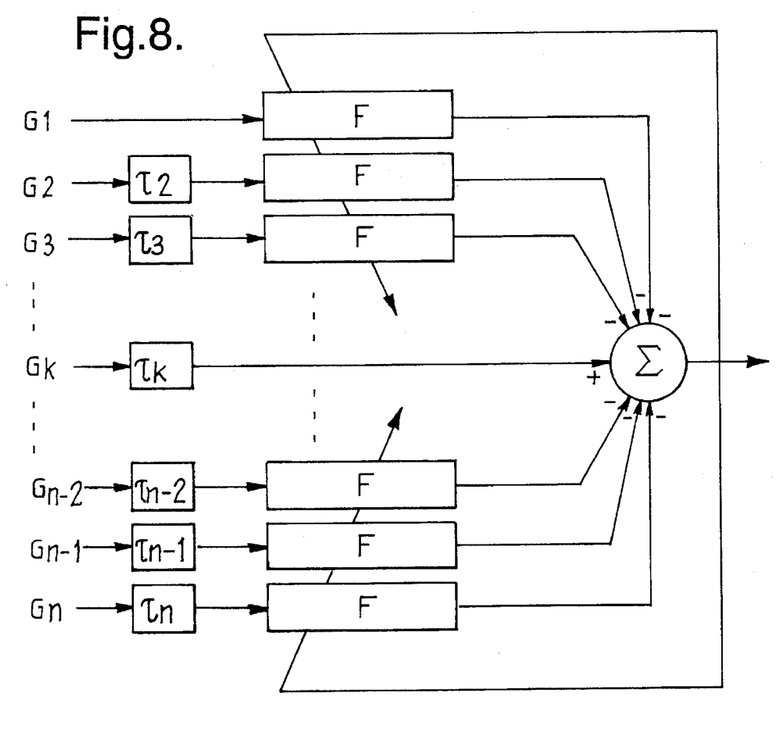
FIG. 8 shows a signal flow diagram of an embodiment of the second aspect of the invention using multiple sensors.
Figure 9:
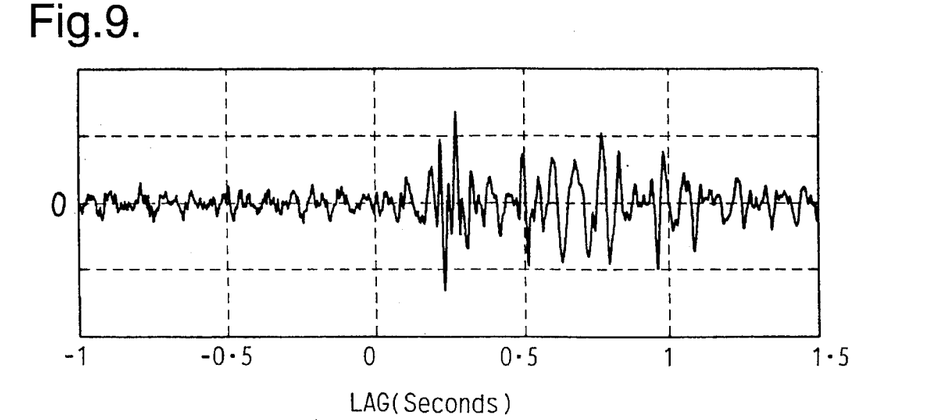
FIG. 9 shows the cross correlation between the rig sensor signal and the geophone signal processed by the system of FIG. 6.
Figure 10:
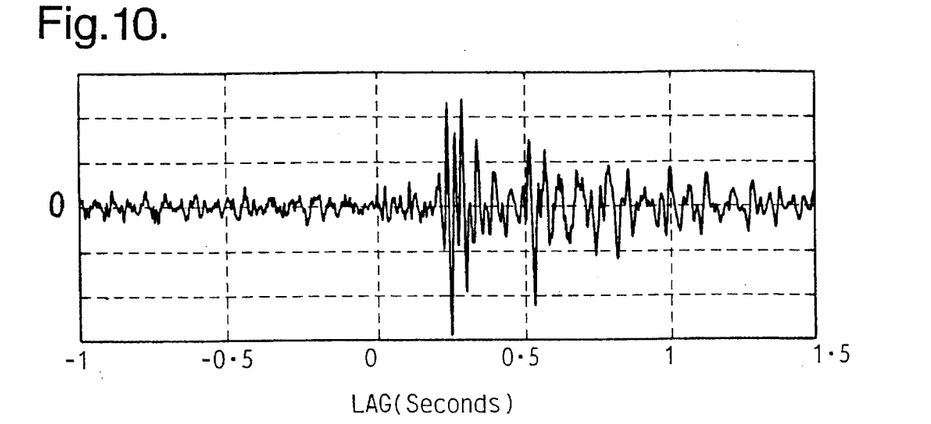
FIG. 10 shows the cross correlation between the rig sensor signal and the geophone signals processed by the system of FIG. 7.
Figure 11:
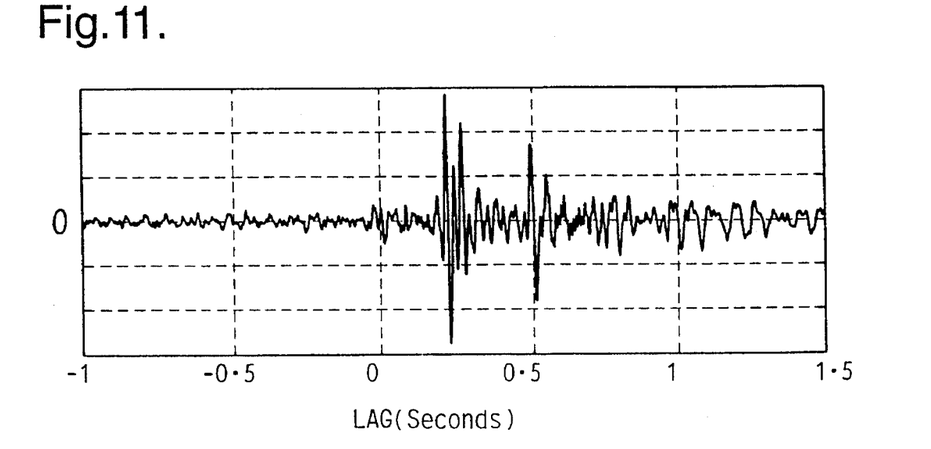
FIG. 11 shows the cross correlation between the rig sensor signal and the geophone signal processed by the system of FIG. 8.

The cross correlation of rig sensor and geophone from the systems shown in FIGS. 6, 7 and 8 are shown in FIGS. 9, 10 and 11.

The signal processing method of the present invention can be applied to an array of sensors as well as the two geophone systems described above. It is preferred that such an array comprises an adaptive beamforming system to further reduce the effect of ground roll or other interference.

In an adaptive beamforming technique, the outputs of the individual geophones in the array are digitized and then combined in such a way as to allow a signal coming from a specified direction (i.e. a signal with a particular moveout across the array) to pass while at the same time rejecting signals coming from any other direction (i.e. with any other moveout). The specified direction is called the look direction.

Figure 12:
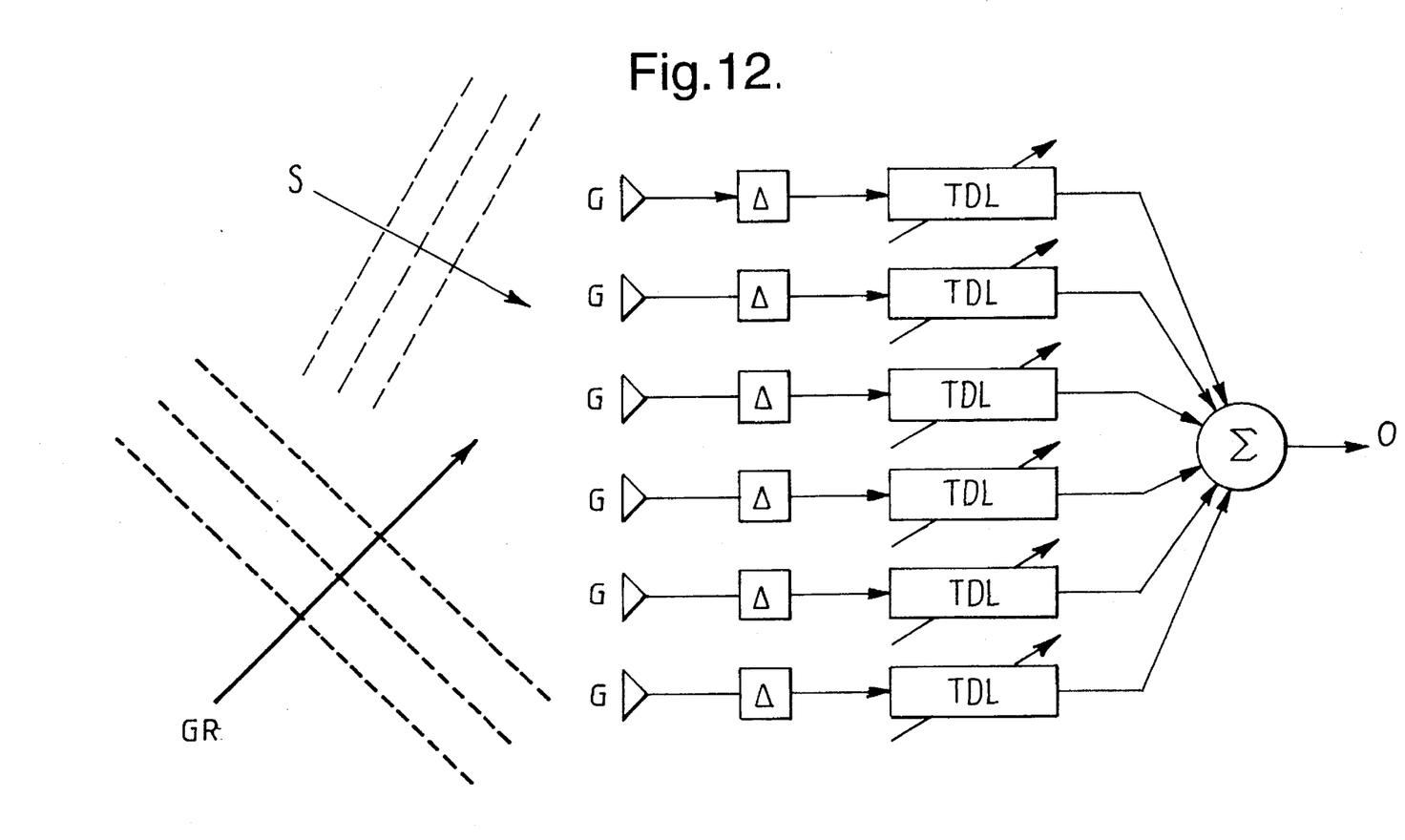
FIG. 12 shows a signal flow diagram of an adaptive beamforming array.

There are a large family of structures and algorithms available to perform this adaptive beamforming. One particular robust and simple technique is the so called Frost beamformer. A signal flow diagram of the Frost beamformer is shown in FIG. 12 and comprises an array of geophones G each being connected via a steering delay $\Delta$ to a tapped delay line filter TDL. The outputs from each TDL are summed I and output as a signal O.

Initially the steering delays' are adjusted so that the desired signal is in the look direction (this allows corrections for individual statics between geophones to be made). The processor $\Sigma$ then automatically adapts to minimize the array output power subject to the constraint that the signals coming from the look direction must pass. This has the effect of forming nulls in the array gain pattern in the directions of the interfering ground roll sources GR. The number of nulls formed depends upon the number of sensors in the array, e.g. if there are M sensors then M−1 nulls can be formed. Details of the adaptive algorithm can be found in "Proceedings of IEEE" 60(8): 926–935, August 1972—An algorithm for linearly constrained adaptive array processing, O L Frost, and "Proceedings of IEEE" 57(10): 1696–1704, October 1969—A simple adaptive algorithm for real-time processing in antenna arrays, L S Griffiths.

Figure 13:
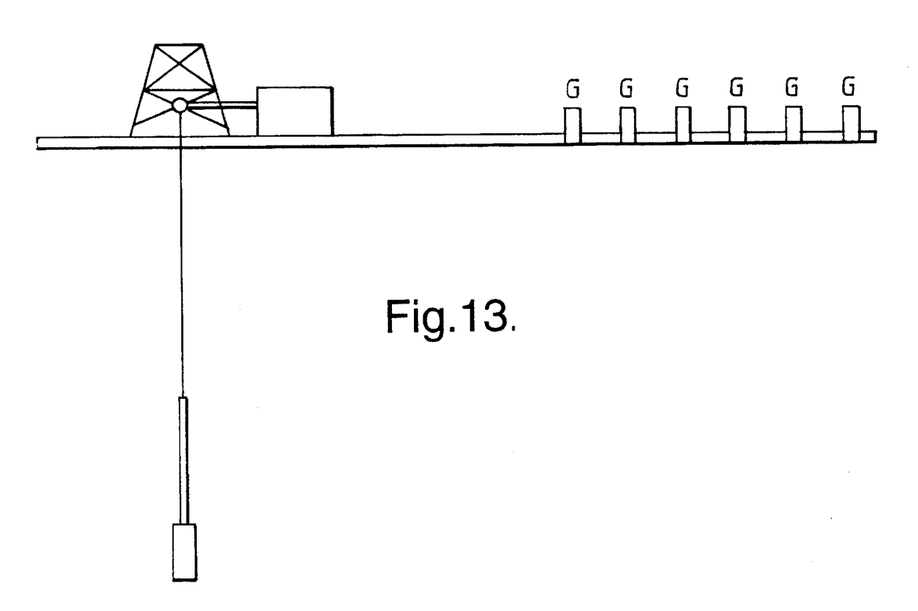
FIG. 13 shows the acquisition geometry utilizing a beamforming array.
Figure 14:
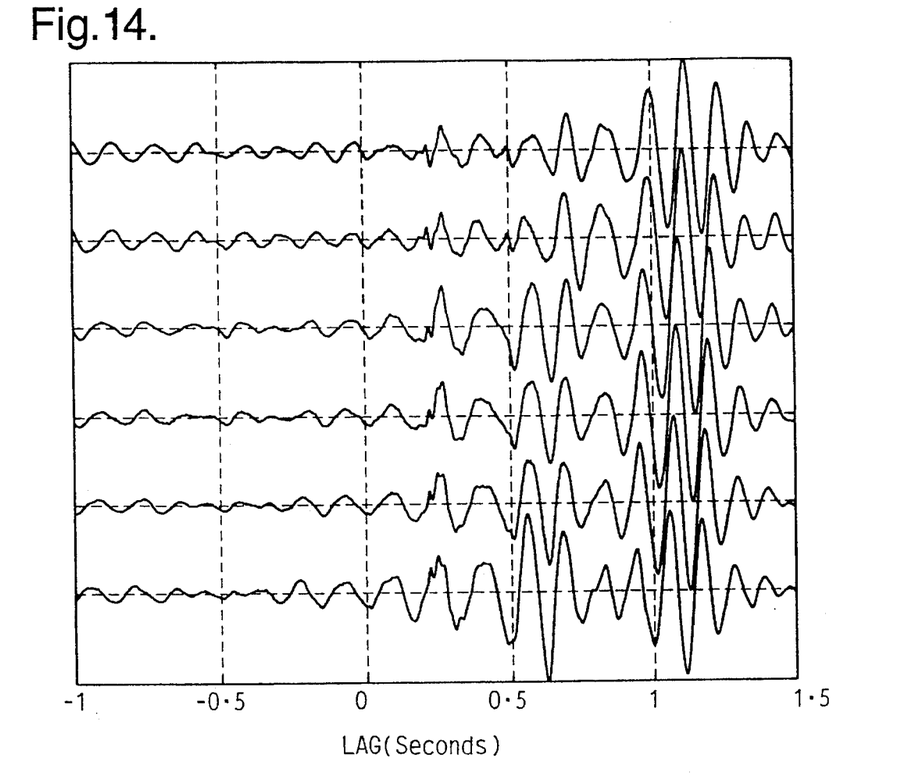
FIG. 14 shows the cross correlation between the geophone signals and the rig sensor signal from the geometry shown in FIG. 13.
Figure 15:
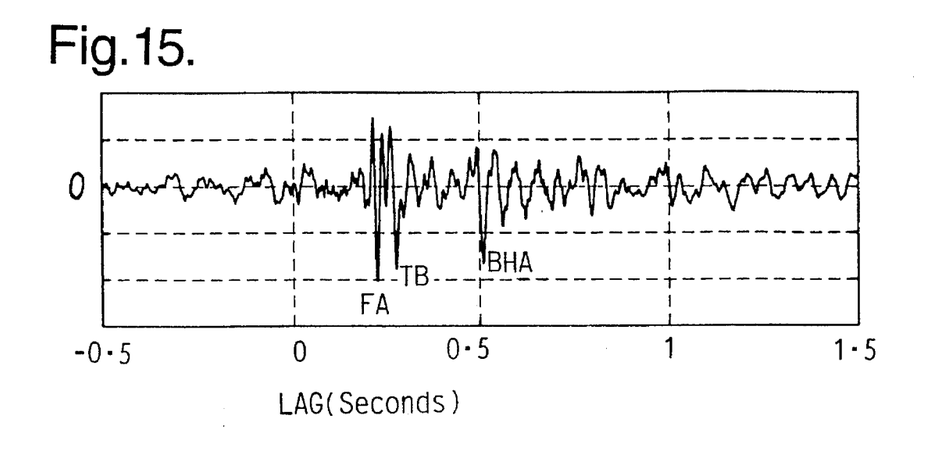
FIG. 15 shows the cross correlation between the beamformed array signal and the rig sensor from the geometry showing in FIG. 13.
Figure 16:
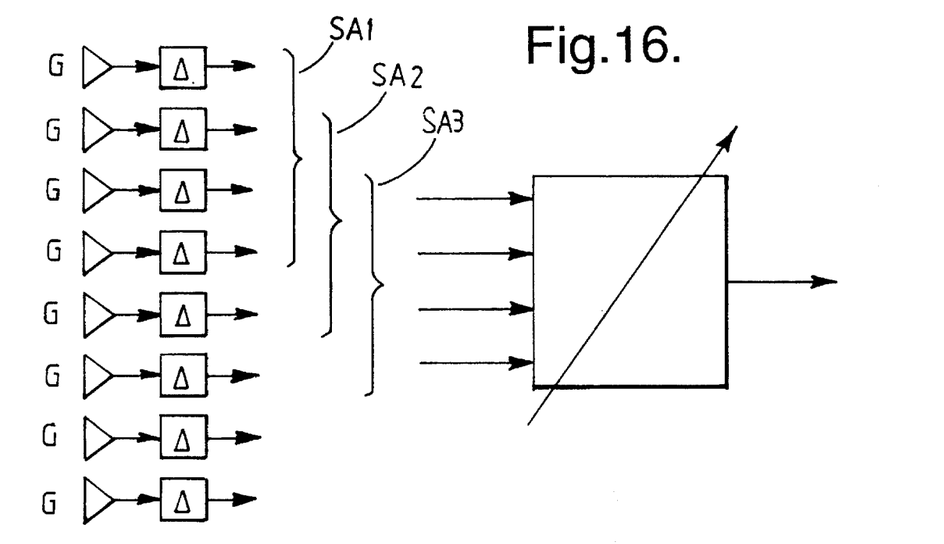
FIG. 16 shows a signal flow diagram of a beam forming array with spatial smoothing.

FIG. 13 shows the acquisition geometry of a drilling test. Typically the first geophone is 162 m from the rig, the spacing between geophones being 2.44 m as before. The signals, six geophones G and one rig sensor R, were logged at 500 Hz for 3 minutes. FIG. 14 shows the cross correlation between the sum of the geophone signals and the rig sensor signal. The multiples in the rig sensor signals due to the drill string structure were removed prior to cross correlation. FIG. 15 shows the cross correlation between the rig sensor and the beamformed geophone array. The first arrival FA is now evident. The other peaks in the cross correlation are due to multiples contained in the signal S, reflections of TB and BHA. If, however, one of the components of the ground roll is correlated with S then the adaptive processor will tend to kill S along with the ground roll. To avoid this the technique of spatial smoothing can be used. This is achieved by dividing the array of geophones G into a series of smaller overlapping subarrays, $SA_1$, $SA_2$, $SA_3$, and adapting on the output of each subarray in turn. This has the effect of destroying the correlation between the ground roll GR and S while at the same time maintaining nulls in the direction of the interfering sources. A schematic of the spatial smoothing beamformer is shown in FIG. 16. The adaptive processor could be a Frost processor, or any other type of adaptive beamforming algorithm.

Figure 17:
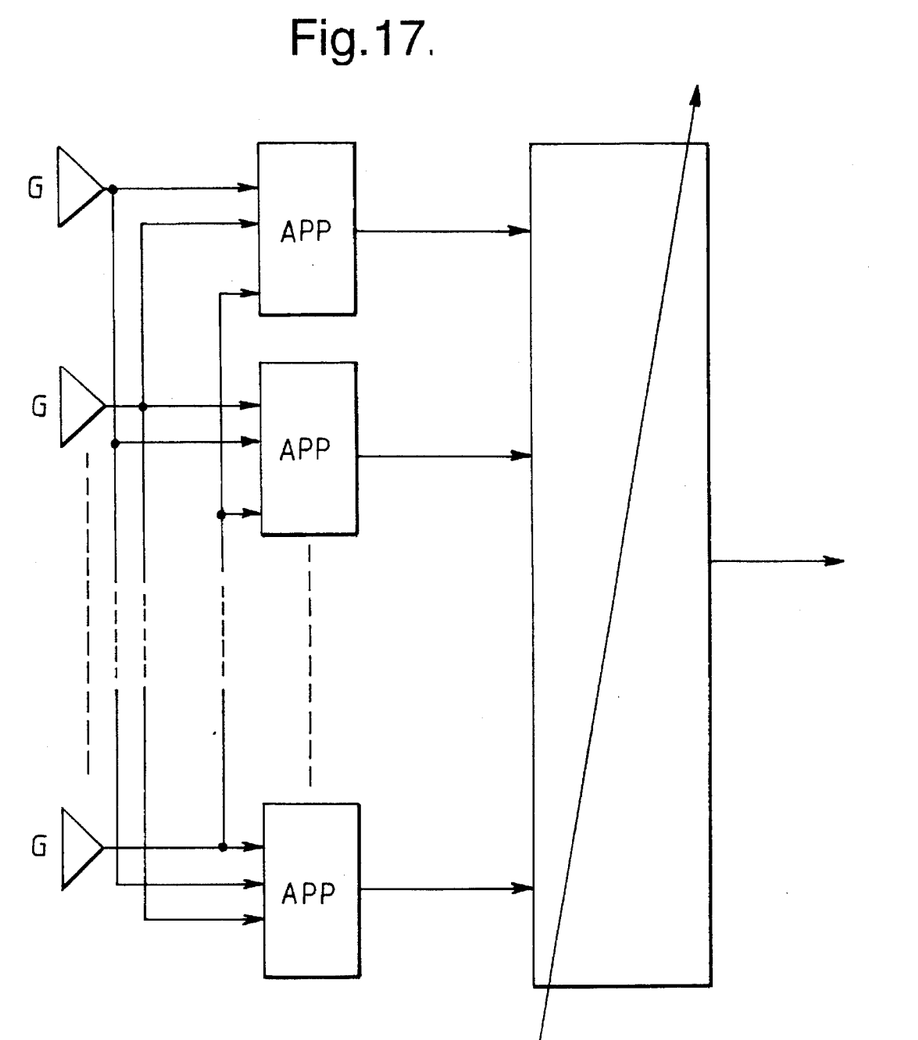
FIG. 17 shows a signal flow diagram of the noise cancellation system according to the present invention when applied to a beamforming array.

A preferred embodiment of the present invention combines the adaptive noise cancelling technique according to the present invention with the adaptive beamforming approach outlined above. The preprocessing exploits the difference in moveout across the array between the bit generated signal and the ground roll, as described previously. A signal flow diagram of the system is shown in FIG. 17. If there are N geophones then N outputs go to the adaptive beamformer. The adaptive preprocessing (APP) can be accomplished by any suitable algorithm and the beamforming can be performed by any of the algorithms referred to above.

Figure 18:
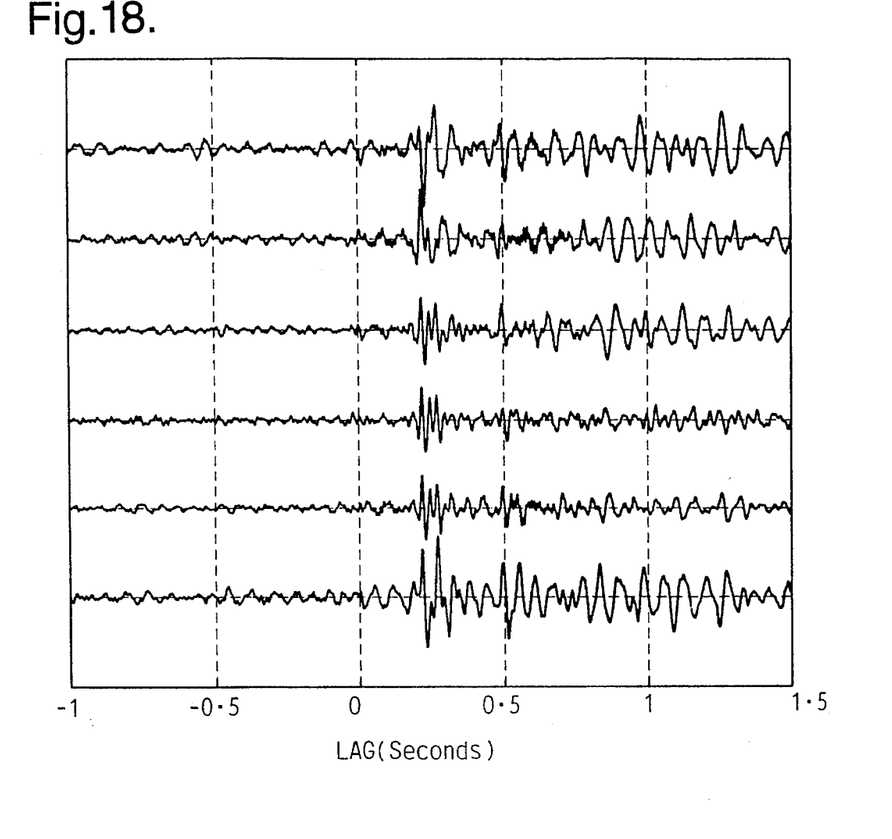
FIG. 18 shows the cross correlation between the rig sensor and each of the preprocessor channels for the arrangement of FIG. 17.
Figure 19:
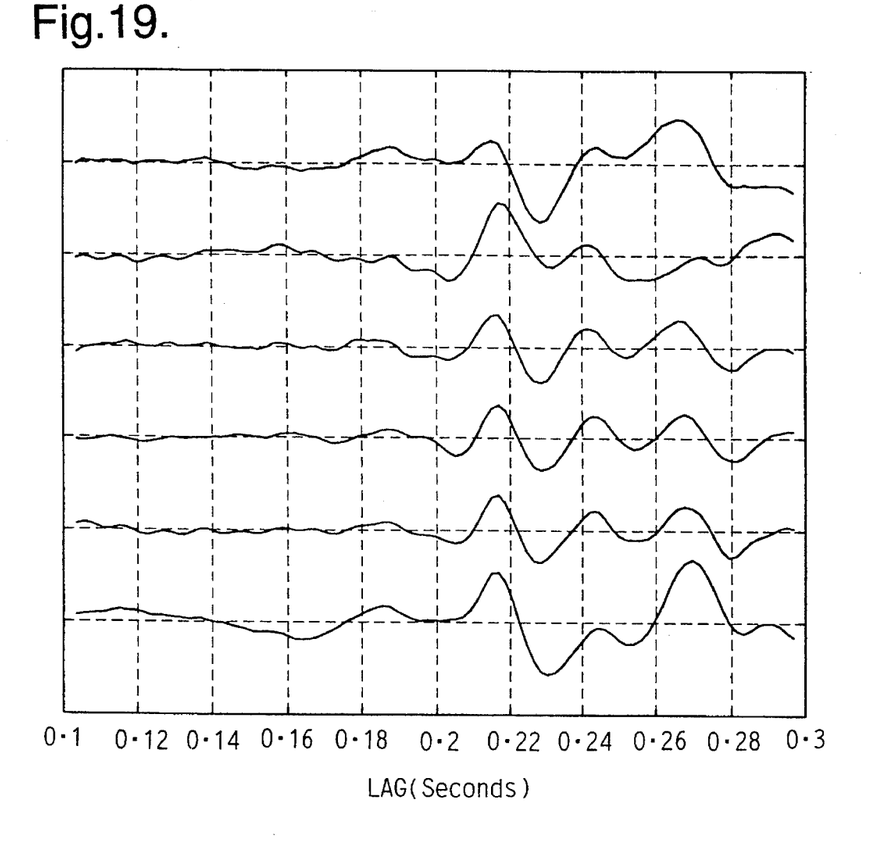
FIG. 19 shows in detail a region of FIG. 18.
Figure 20:
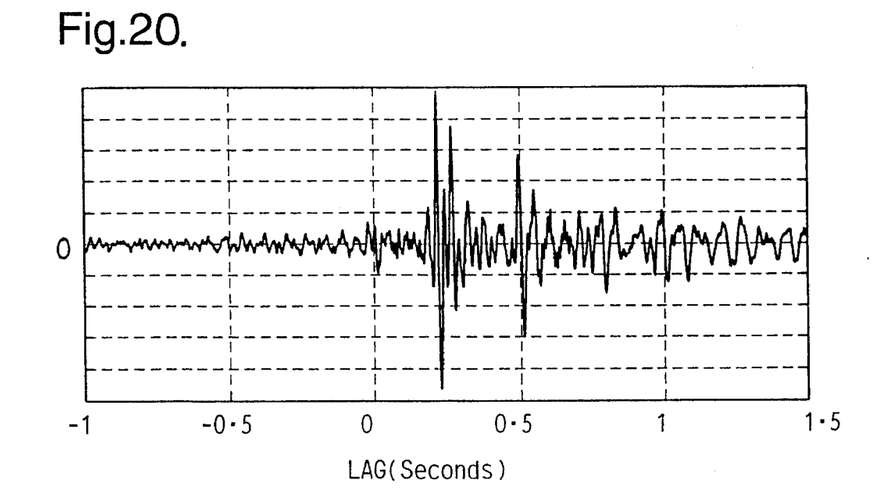
FIG. 20 shows the cross correlation between the summed geophone signal and the rig sensor corrected for statics.

FIG. 18 shows the cross correlation between the rig sensor and each of the output channels from the preprocessor. In this case the preprocessor used a normalized LMS algorithm with 20 tap weights for each channel. The first arrival can be seen in each of the traces at about 0.23 seconds. However a closer examination reveals that his first arrival is not at exactly the same point for each trace. This is shown in FIG. 19. This is due to statics between individual geophones. These statics can be corrected for by inserting delays in the output lines of the preprocessor. After correcting for the statics, simply adding these outputs and cross correlating with the rig sensor gives the result in FIG. 20.

Figure 21:
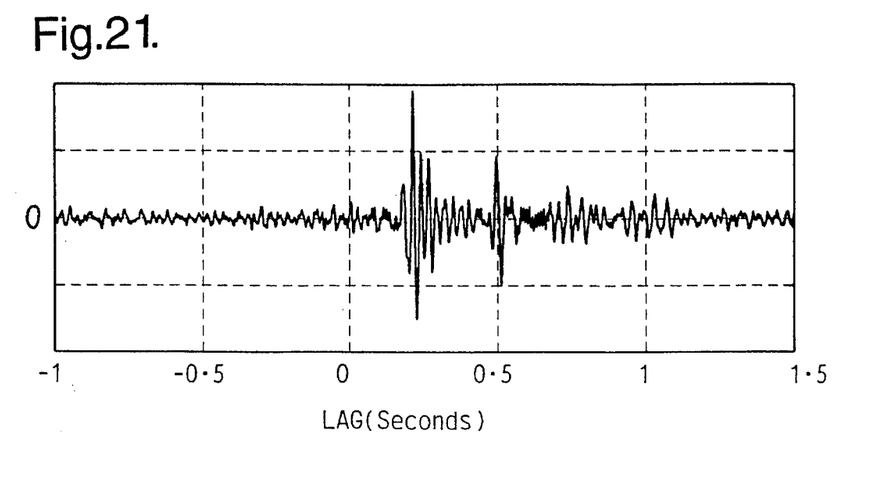
FIG. 21 shows the cross correlation between the beamformed preprocessed signal and the rig sensor.

FIG. 21 shows the cross correlation between the final beamformed output and the rig sensor. The first arrival is now evident. The other peaks in the cross correlation are due to multiples contained in the signal S due to internal reflections in the drill string. The beamformer used was a Frost type beamformer.

The use of preprocessing in this way means that the number of tap weights in the adaptive beamformer can be made much less than would otherwise be needed. It also allows individual statics between geophones to be corrected before beamforming, thus preventing the loss of high frequency components.

The processing described could be carded out after acquisition, or it could be carded out in real time by "smart" geophone arrays.

I claim:

1. A method for improving the signal-to-noise ratio from a pair of seismic detectors which each detect a noisy signal comprising a seismic signal (S) and a noise signal (N), wherein the seismic signal (S) has a different moveout across the pair of seismic detectors from that of the noise signal (N), the noise signal (N) from a given source is detected at the first detector at a time Δt before the corresponding noise signal is detected at the second detector, and the separation of the detectors is such that the noise signal (N) detected at the second detector is substantially the same as that detected at the first detector, the method comprising delaying the noisy signal (S+N) detected at the first detector by an amount τ being greater than the moveout of the seismic signal but not more than Δt and subtracting the delayed signal from that detected at the second detector by means of an adaptive filter so as to minimize the power in the resultant signal, yielding a representation of the seismic signal with attenuated noise level.

2. A method as claimed in claim 1, wherein the signal detected at the first detector and the resultant signal are delayed by an amount $\tau_2$ and the signal detected at the second detector is subtracted from the delayed first detector and resultant signals by means of an adaptive filter so as to minimize the power in the final signal, the delay $\tau_2$ being greater than the moveout of the signal of interest plus the length of the filter but not more than Δt plus the length of the filter.

3. A method as claimed in claim 1, wherein the pair of seismic detectors form part of a larger detector array.

4. A method as claimed in claim 3, wherein the array includes a beam steering arrangement.

5. A method as claimed in claim 1, wherein the seismic signal is generated by a drill bit during the drilling of a well.

6. A method as claimed in claim 1, wherein the noise (N) comprises ground roll.

7. A method for improving the signal-to-noise ratio from a pair of seismic detectors which each detect a noisy signal comprising a seismic signal (S) and a noise signal (N), wherein the seismic signal (S) has a different moveout across the pair of seismic detectors from that of the noise signal (N), and the noise signal (N) from a given source is detected at the first detector at a time Δt before the corresponding noise signal is detected at the second detector, and the separation of the seismic detectors is such that the noise signal (N) detected at the second detector is substantially the same as that detected at the first detector, the method comprising delaying the noisy signal (S+N) detected at the first detector by an amount $\tau_2$ and subtracting the signal detected at the second detector from the delayed signal by means of an adaptive filter so as to minimize the power in the resultant signal, the delay $\tau_2$ being greater than the moveout of the signal of interest plus the length of the filter but not more than Δt plus the length of the filter, yielding a representation of the seismic signal with attenuated noise level.

8. A method as claimed in claim 8, wherein the pair of seismic detectors form part of a larger seismic detector array.

9. A method as claimed in claim 8, wherein the array includes a beam steering arrangement.

10. A method as claimed in claim 7, wherein the seismic signal is generated by a drill bit during the drilling of a well.

11. A method as claimed in claim 7, wherein the noise (N) comprises ground roll.

12. A seismic detector system for improved signal-to-noise ratio performance comprising:

a) a pair of seismic detectors arranged such that a seismic signal (S) has a different moveout across the pair of seismic detectors from a noise signal (N) which arrives at a first detector of the pair at a time Δt before the corresponding noise signal arrives at the second detector of the pair; the separation of the seismic detectors being such that the noise signal (N) detected at the second detector is substantially the same as that detected at the first detector;

b) delay means which delays the noisy signal (S+N) detected by the first detector by an amount τ being greater than the moveout of the signal of interest but not more than $\Delta t$;

c) an adaptive filter for subtracting the delayed signal from the signal (S+N) detected by the second detector, said adaptive filter arranged to minimize the power in the resultant signal after subtraction, yielding a representation of the seismic signal with attenuated noise level.

13. A system as claimed in claim 12, further comprising delay means which delays the signal detected at the first detector and the resultant signal by an amount $\tau_2$; and an adaptive filter for subtracting the signal detected at the second detector from the delayed first detector and resultant signals, said adaptive filter arranged to minimize the power in the final signal; the delay $\tau_2$ being greater than the moveout of the seismic signal plus the length of the filter but not more than $\Delta t$ plus the length of the filter.

14. A system as claimed in claim 12, wherein the pair of seismic detectors form part of a larger seismic detector array.

15. A system as claimed in claim 14 wherein the array includes a beam steering arrangement.

16. A system as claimed in claim 12, further comprising a seismic source for generating the seismic signal.

17. A system as claimed in claim 16, wherein the source comprises a drill bit which generates the seismic signals during drilling of a well.

18. A system as claimed in claim 17, wherein the noise (N) is at least partly generated by a rig on the surface from which the well is being drilled.

19. A system as claimed in claim 12, wherein the seismic detectors comprise a linear arrangement with the source of the noise signal.

20. A seismic detector system for improved signal-to-noise ratio performance comprising:

a) a pair of seismic detectors arranged such that a seismic signal (S) has a different moveout across the pair of detectors from a noise signal (N) which arrives at a first detector of the pair at a time $\Delta t$ before the corresponding noise signal arrives at the second detector of the pair; the separation of the detectors being such that the noise signal (N) detected at the second detector is substantially the same as that detected at the first detector, b) delay means which delays the noisy signal (S+N) detected by the first detector by an amount $\tau_2$;

c) an adaptive filter subtracting the signal (S+N) detected by the second detector from the delayed signal, said adaptive filter arranged to minimize the power in the resultant signal after subtraction, the amount $\tau_2$ being greater than the moveout of the seismic signal plus the length of the filter but not more than $\Delta t$ plus the length of the filter, yielding a representation of the seismic signal with attenuated noise level.

21. A system as claimed in claim 20, wherein the pair of seismic detectors form part of a larger seismic detector array.

22. A system as claimed in claim 21 wherein the array includes a beam steering arrangement.

23. A system as claimed in claim 20, further comprising a seismic source for generating the seismic signal.

24. A system as claimed in claim 23 wherein the source comprises a drill bit which generates the signals during drilling of a well.

25. A system as claimed in claim 24, wherein the noise (N) is at least partly generated by a rig on the surface from which the well is being drilled.

26. A system as claimed in claim 20, wherein the seismic detectors comprise a linear arrangement with the source of the noise signal.

* * * * *